Feb. 13, 1934.                B. D. BEDFORD                1,947,242
                    ELECTRIC VALVE CONVERTING APPARATUS
                           Filed Nov. 16, 1932
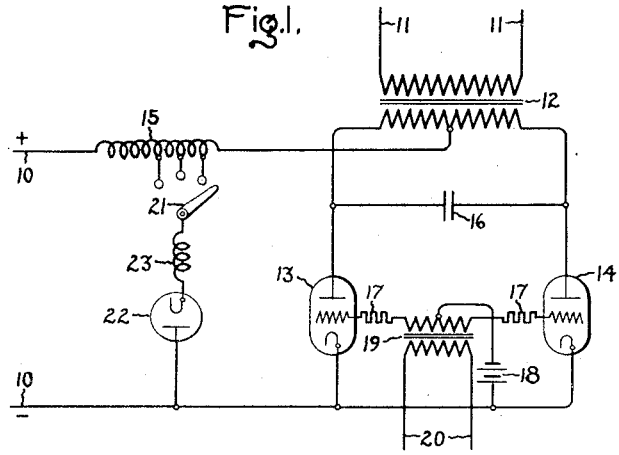
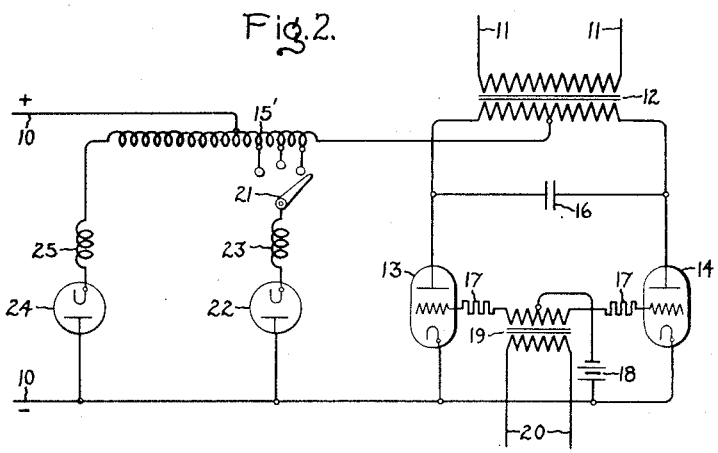
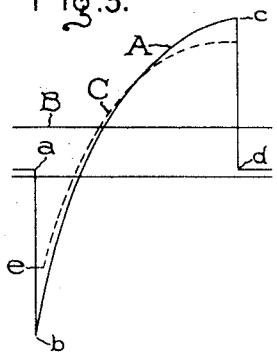
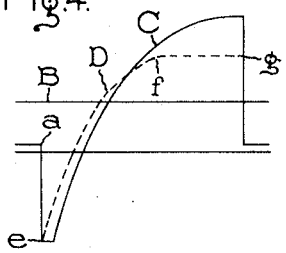
Inventor:
Burnice D. Bedford,
by Charles E. Tullar
His Attorney.

Patented Feb. 13, 1934

1,947,242

UNITED STATES PATENT OFFICE 1,947,242

ELECTRIC VALVE CONVERTING APPARATUS

Burnice D. Bedford, Schenectady, N. Y., assignor to General Electric Company, a corporation of New York Application November 16, 1932
Serial No. 642,925

8 Claims. (Cl. 175—363)

My invention relates to electric valve converting apparatus and more particularly to such apparatus for transmitting energy from a direct-current supply circuit to an independent alternating-current load circuit subject to substantial load variations.

It is often desirable to convert direct current into alternating current by means of an electric valve converting apparatus to energize an independent alternating current load circuit; that is, one which is not connected to a source of electromotive force for determining its frequency and wave form. In this type of apparatus it is generally preferable to use a capacitor for commutating the current between the several electric valves and a reactor interposed between the converting apparatus and the direct-current supply circuit for minimizing the current pulsations drawn from the supply circuit. If the alternating-current circuit is subject to substantial load variations, however, it has been found that the smoothing reactor and the capacitor tend to oscillate to higher and higher voltages under light load conditions, thus raising the voltage of the alternating-current circuit excessively and occasionally producing disruptive voltages in other portions of the converting apparatus. It has heretofore been proposed in such arrangements to feed back energy from the alternating-current circuit to the direct-current circuit under such load conditions on the alternating-current circuit as would tend to produce excessive voltages. My invention relates more specifically to an improved and simplified arrangement for controlling the wave form and magnitude of the voltage impressed upon an alternating-current circuit by such an electric valve converting apparatus under light load conditions.

It is an object of my invention, therefore, to provide an improved electric valve converting apparatus for transmitting energy from a direct-current supply circuit to an independent alternating-current load circuit subject to substantial load variations which will overcome the above mentioned disadvantages of the arrangements of the prior art and which will be simple and reliable in operation.

It is another object of my invention to provide an improved electric valve converting apparatus for transmitting energy from a direct-current supply circuit to an independent alternating-current load circuit subject to substantial load variations provided with means for limiting the voltage on the alternating-current circuit under light load conditions to a predetermined maximum.

It is a further object of my invention to provide an improved electric valve converting apparatus for transmitting energy from a direct-current supply circuit to an independent alternating-current load circuit subject to substantial load variations in which the magnitude and wave form of the alternating potential impressed upon the load circuit may be maintained within prescribed limits.

In accordance with one embodiment of my invention, a direct-current supply circuit and an independent alternating-current load circuit are interconnected through an electric valve converting apparatus of the type known in the art as a parallel inverter. Included in the connection from one side of the direct-current circuit to the apparatus is an inductance device or smoothing reactor. An auxiliary electric valve is connected in parallel to the converting apparatus between the inductance device and the apparatus with such a polarity that it is nonconductive to the unidirectional current drawn from the supply circuit, but is effective to accelerate the discharge of the commutating capacitor in case it oscillates to voltages above a predetermined value, which in the particular connection illustrated, corresponds to a voltage equal to substantially twice that of the direct-current supply circuit. If desired, the inductance device may be provided with intermediate spaced terminals and the valve may be selectively connected to any of these terminals to vary the operating characteristics of the apparatus. In accordance with another feature of my invention the inductance device is extended from the point of connection to the supply circuit in a direction opposite to that portion connected to the converting apparatus; in other words, the inductance device is provided with an intermediate electrical terminal, and one end is connected to the converting apparatus and to the other side of the direct-current circuit through the electric valve described above. The other terminal of the inductance device is also connected to the other side of the direct-current through an additional electric valve which is positively effective to limit the maximum voltage to which the commutating capacitor oscillates.

For a better understanding of my invention, together with other and further objects thereof, reference is had to the following description taken in connection with the accompanying drawing and its scope will be pointed out in the appended claims. Referring to the drawing, Fig. 1 illustrates an arrangement embodying my invention for transmitting energy from a direct-current supply circuit to a single-phase independent alternating-current circuit; Fig. 2 shows a modification of the arrangement of Fig. 1, including means for positively limiting the maximum voltage to which the commutating condenser may oscillate; while Figs. 3 and 4 illustrate certain operating characteristics of the arrangements of Figs. 1 and 2.

Referring now more particularly to Fig. 1 of the drawing, there is illustrated an arrangement for transmitting energy from a direct-current supply circuit 10 to an alternating-current load circuit 11. This apparatus comprises a transformer 12 provided with a secondary winding connected to the alternating-current circuit 11 and with a primary winding having an electrical midpoint connected to one side of the direct-current circuit 10 and with end terminals connected to the other side of the direct-current circuit 10 through electric valves 13 and 14. A current smoothing reactor, or inductance device 15, is included in the connection from the positive side of the direct-current circuit to the electrical midpoint of the primary winding of the transformer 12, while a commutating capacitor 16 is connected across the primary winding of the transformer 12 and between corresponding electrodes of the valves 13 and 14. The electric valves 13 and 14 are each provided with an anode, a cathode and a control grid and may be of any of the several types well known in the art, although I prefer to utilize valves of the vapor electric discharge type.

In order successively to render the valves 13 and 14 alternately conductive and nonconductive, their grids are connected to their common cathode circuit through current-limiting resistors 17, a negative bias battery 18 and opposite halves of the secondary winding of a grid transformer 19, the primary winding of which may be energized from any suitable alternating-current circuit 20 of a frequency which it is desired to supply the alternating-current circuit 11. In case it is not necessary to fix the frequency of the alternating-current circuit 11, the primary winding of the grid transformer 19 may be energized therefrom through any suitable phase-adjusting means, as is well understood by those skilled in the art. The inductance device 15 is provided with a plurality of electrically spaced terminals, as illustrated, which may be selectively connected to the other side of the direct-current circuit through a switch 21 and an electric valve 22, which may be of any of the several types well known in the art. If desired, a current-limiting reactor 23 may be included in the circuit of the valve 22 to minimize transient surges. The electric valve 22 is connected with such a polarity as to be nonconductive to the unidirectional current of the supply circuit 10. In some instances the intermediate terminals of the inductance device 15 may be omitted and the circuit of the electric valve 22 connected directly to the terminal of the inductance device 15 which is connected to the midpoint of the primary winding of the transformer 12.

The general principles of operation of the above described inverting apparatus will be well understood by those skilled in the art. In brief, if the switch 21 is in its illustrated position and one of the electric valves, for example, the valve 13 is initially rendered conductive, current will flow from the positive side of the direct-current circuit through the left hand portion of the primary winding of the transformer 12 and electric valve 13 to the other side of the direct-current circuit, inducing a half cycle of alternating current in the transformer 12. During this interval the capacitor 16 will become charged with such a polarity that when, substantially 180 degrees later, electric valve 14 is rendered conductive, the capacitor 16 is effective to transfer the current from the valve 13 to the valve 14. Current now flows through the right hand portion of the primary winding of the transformer 12 and electric valve 14, inducing a half cycle of alternating current of opposite polarity in the transformer 12. In this manner the current is successively commutated between the electric valves.

With an arrangement of the type just described utilizing vapor electric valves, the capacitor 16 must have a sufficient capacity to maintain the anode-cathode voltage of the valve in which current has just been interrupted negative for a sufficient interval of time to permit the grid to deionize the valve, as is well understood by those skilled in the art. Since the ionization of an electric valve of this type increases with the load current, the capacitor 16 must be sufficiently large to permit a deionization of the valves under maximum load conditions. Under light load conditions, however, the reactor 15 and capacitor 16 may tend to oscillate to excessive voltages; for example, the anode-cathode voltage of one of the electric valves may be as represented by the curve A of Fig. 3, in which the curve B represents the voltage of the supply circuit 10. The valve is conductive up to the point $a$, when capacitor 16 initiates the current in the valve 14 and interrupts it in the valve 13. The result is that the full potential $a—b$ of the capacitor 16 is impressed between the anode and cathode of the electric valve 13, as indicated. The capacitor 16 then begins to discharge through the primary winding of the transformer 12 and to be charged to an opposite polarity up to the point $c$ of the curve A. It is seen that both the positive and negative values of the anode-cathode potential of the valve are substantially greater than twice the potential of the supply circuit 10. Since the curve A represents one half cycle of the alternating potential of the circuit 11 (but of twice the amplitude), it is seen that the alternating potential of the circuit 11 is dependent directly upon the maximum potentials to which the capacitor 16 oscillates and that these potentials may become excessive under light load conditions. Now if the switch 21 is operated to the right hand terminal of the inductance device 15, the potential of the right hand terminal of the device 15 will be equal to one half that represented by the curve A, that is, one half of the potential across the primary winding of the transformer 12, since it is connected to the midpoint of the transformer primary winding and electric valve 14 is conducting current. Therefore, when the capacitor 16 tends to lower the potential of the anode of the valve 13 beyond the point $e$, which is substantially twice the potential of the direct-current circuit when the valve 22 is connected to the right hand terminal of the reactor 15, the electric valve 22 operates to short circuit the capacitor 16 through the transformer 12, and to limit the anode potential of the valve 13 to this value $e$. Under these conditions the capacitor 16 will not oscillate to as high a positive potential but will follow up the dotted curve C, as illustrated in Fig. 3. By operating the switch 21 to one of the intermediate taps, the capacitor 16 will oscillate to a higher potential before being short circuited by the valve 22. Thus both the positive and negative peaks of the alternating potential supplied to the circuit 11 are substantially decreased or limited to a predetermined maximum.

The arrangement of Fig. 2 is similar to that of Fig. 1 with the exception that the inductance device 15' is extended beyond the other side of the point of connection to the direct-current circuit 10 so that the circuit 10 is in effect connected to an intermediate electrical terminal of inductance device 15' and the other end terminal of the device 15' is connected to the other side of the direct-current circuit 10 through an additional electric valve 24 and current limiting reactor 25. The right hand portion of the inductance device 15' is preferably of a smaller number of turns than the left-hand portion. The operation is similar to that of the arrangement illustrated in Fig. 1 with the exception that, in case the potential of the right-hand terminal of the inductance device 15 exceeds substantially the potential of the supply circuit 10, corresponding to an anode potential of the electric valve 13 on the upper portion of the curve C of Figs. 3 or 4, the potential of the left-hand terminal of the inductance device 15' will become lower than the negative side of the direct-current circuit 10. Under these conditions, the electric valve 24 will become conductive to hold the potential of the left-hand terminal of the inductance device 15' to that of the negative side of the direct-current circuit and thus hold the potential of the right-hand terminal of the inductance device 15 to substantially twice that of the direct-current circuit 10, and with it the anode potential of the valve 15 will be held at substantially twice that of the direct-current circuit, as illustrated by the portion $f-g$ of the curve D of Fig. 4. In this manner, both the positive and negative potentials to which the capacitor 16 may oscillate are maintained within predetermined limits and with them the maximum values of the alternating potential of the circuit 11. Obviously, electric valve 24 may be connected to an intermediate terminal of the inductance device 15' on the left hand side of its midpoint, to which is connected the direct-current circuit 10, in case it is desired to obtain intermediate regulaton.

While I have described my invention as applied to an arrangement for transmitting energy from a direct-current supply circuit through a single-phase half wave inverting apparatus to an independent alternating-current load circuit, it will be obvious to those skilled in the art that it is equally applicable to a system utilizing a polyphase electric valve converting apparatus, or an apparatus of the full wave type.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. Apparatus for transmitting energy from a direct-current supply circuit to an independent alternating-current load circuit subject to substantial load variations, comprising an inductive winding, a plurality of electric valves interconnecting said circuits through said winding, means for successively rendering said valves alternately conductive and nonconductive, means for commutating the current between said valves, impedance means interposed between said supply circuit and said apparatus, and means for independently loading said apparatus only during the commutating period under predetermined load conditions.

2. Apparatus for transmitting energy from a direct-current supply circuit to an independent alternating-current load circuit subject to substantial load variations, comprising an inductive winding, a plurality of electric valves interconnecting said circuits through said winding, means for successively rendering said valves alternately conductive and nonconductive, a commutating capacitor connected between said valves, impedance means interposed between said supply circuit and said apparatus, and means for accelerating the discharge of the commutating capacitor under predetermined load conditions.

3. Apparatus for transmitting energy from a direct-current supply circuit to an independent alternating-current load circuit subject to substantial load variations, comprising an inductive winding, a plurality of electric valves interconnecting said circuits through said winding, means for successively rendering said valves alternately conductive and nonconductive, a commutating capacitor connected between said valves, an inductance device interposed between said supply circuit and said apparatus, and an electric valve connected in parallel to said apparatus with such a polarity as to be nonconductive to the unidirectional current of said supply circuit.

4. Apparatus for transmitting energy from a direct-current supply circuit to an independent alternating-current load circuit subject to substantial load variations, comprising an inductive winding, a plurality of electric valves interconnecting said circuits through said winding, means for successively rendering said valves alternately conductive and nonconductive, a commutating capacitor connected between said valves, an inductive device included in the connection from one side of said supply circuit to said apparatus, and an electric valve connected from said inductance device to the other side of said supply circuit with such a polarity as to be nonconductive to the unidirectional current of said supply circuit.

5. Apparatus for transmitting energy from a direct-current supply circuit to an independent alternating-current load circuit subject to substantial load variations, comprising an inductive winding, a plurality of electric valves interconnecting said circuits through said winding, means for successively rendering said valves alternately conductive and nonconductive, a commutating capacitor connected between said valves, an inductance device included in the connection from one side of said supply circuit to said apparatus, said inductance device being provided with a plurality of electrically spaced terminals, an auxiliary electric valve, and switching means for selectively connecting said auxiliary electric valve between one of said spaced terminals and the other side of the supply circuit with such a polarity as to be nonconductive to the unidirectional current of said supply circuit.

6. Apparatus for transmitting energy from a direct-current supply circuit to an independent alternating-current load circuit subject to substantial load variations, comprising an inductive winding, a plurality of electric valves interconnecting said circuits through said winding, means for successively rendering said valves alternately conductive and nonconductive, means for commutating the current between said valves, an inductance device included in the connection from one side of said supply circuit to said apparatus, said inductance device being provided with electrically spaced terminals, and an electric valve connected from a terminal of said inductance device to the other side of said supply circuit to limit the peak value of the alternating potential to a predeterminal value.

7. Apparatus for transmitting energy from a direct-current supply circuit to an independent alternating-current load circuit subject to substantial load variations, comprising an inductive winding, a plurality of electric valves interconnecting said circuits through said winding, means for successively rendering said valves alternately conductive and nonconductive, means for commutating the current between said valves, an inductance device interposed between said supply circuit and said apparatus, said inductance device having an intermediate electrical terminal connected to one side of said supply circuit and an end terminal connected to said apparatus, and an electric valve interconnecting the other terminal of said inductance device with the other side of said direct-current circuit.

8. Apparatus for transmitting energy from a direct-current supply circuit to an independent alternating-current load circuit subject to substantial load variations, comprising an inductive winding, a plurality of electric valves interconnecting said circuits through said winding, means for successively rendering said valves alternately conductive and nonconductive, means for commutating the current between said valves, an inductance device interposed between said supply circuit and said apparatus, said inductance device having an intermediate electrical terminal connected to one side of said supply circuit and an end terminal connected to said apparatus, and a pair of electric valves interconnecting the other side of said supply circuit with points of said inductance device on opposite sides of said intermediate terminal, said valves being nonconductive to the unidirectional current of said supply circuit.

BURNICE D. BEDFORD.